No. 702,487. Patented June 17, 1902.
A. F. SANFORD.
COLLECTION FORM.
(Application filed June 24, 1901.)

(No Model.) 4 Sheets—Sheet 1.

Fig. 1.

Balance Due April 1, 1901.

$ .......... from ..........

Payments.

$ .......... to ..........
$ .......... to ..........
$ .......... to ..........

This receipt not good for payments beyond Apr. 1, 1901.
P 200 RECEIVED $ ..........
On Account Subscription to Journal and Tribune.
DATE PAID ..........

This receipt not good for payments beyond Apr. 1, 1901.
P 200 RECEIVED $ ..........
On Account Subscription to Journal and Tribune.
DATE PAID ..........

P 200   PAID IN FULL.
Subscription to the Journal and Tribune to Apr. 1, 1901.

Subscriber No. _____  P 200
How often Collected _____
Where Collected _____

| Apr. 6 | 1 | 26 | PAID. Subscriber No. P 200 Subscription to Journal and Tribune For week ending Apr. 6, 1901. N. B.—Always take these receipts from Carrier. |
| Apr. 13 | 2 | 25 | PAID. Subscriber No. P 200 Subscription to Journal and Tribune For week ending Apr. 13, 1901. |
| Apr. 20 | 3 | 24 | PAID. Subscription to Journal and Tribune For week ending Apr. 20, 1901. |
| Apr. 27 | 4 | 23 | PAID. Subscription to Journal and Tribune For week ending Apr. 27, 1901. |
| May 4 | 5 | 22 | PAID. Subscription to Journal and Tribune For week ending May 4, 1901. |
| May 11 | 6 | 21 | PAID. Subscription to Journal and Tribune For week ending May 11, 1901. |
| May 18 | 7 | 20 | PAID. Subscription to Journal and Tribune For week ending May 18, 1901. |
| May 25 | 8 | 19 | PAID. Subscription to Journal and Tribune For week ending May 25, 1901. |
| June 1 | 9 | 18 | PAID. Subscription to Journal and Tribune For week ending June 1, 1901. |
| June 8 | 10 | 17 | PAID. Subscription to Journal and Tribune For week ending June 8, 1901. |
| June 15 | 11 | 16 | PAID. Subscription to Journal and Tribune For week ending June 15, 1901. |
| June 22 | 12 | 15 | PAID. Subscription to Journal and Tribune For week ending June 22, 1901. |

WITNESSES
Jas. A. Fowler
C. E. Luchy.

INVENTOR
Alfred F. Sanford
By Cyrus Kehr
Atty.

THE NORRIS PETERS CO., PHOTO-LITHO., WASHINGTON, D. C.

No. 702,487.  
A. F. SANFORD.  
COLLECTION FORM.  
(Application filed June 24, 1901.)  
Patented June 17, 1902.

(No Model.) 4 Sheets—Sheet 2.

Fig. 2.

| | PAID. Subscriber No. P 200 |
|---|---|
| June 29 — 13 — 14 | Subscription to Journal and Tribune For week ending June 29, 1901. N. B.—Always take these receipts from Carrier. |
| July 6 — 14 — 13 | PAID. Subscriber No. P 200 Subscription to Journal and Tribune For week ending July 6, 1901. |
| July 13 — 15 — 12 | PAID. Subscriber No. P 200 Subscription to Journal and Tribune For week ending July 13, 1901. |
| July 20 — 16 — 11 | PAID. Subscriber No. P 200 Subscription to Journal and Tribune For week ending July 20, 1901. |
| July 27 — 17 — 10 | PAID. Subscriber No. P 200 Subscription to Journal and Tribune For week ending July 27, 1901. |
| Aug. 3 — 18 — 9 | PAID. Subscriber No. P 200 Subscription to Journal and Tribune For week ending Aug. 3, 1901. |
| Aug. 10 — 19 — 8 | PAID. Subscriber No. P 200 Subscription to Journal and Tribune For week ending Aug. 10, 1901. |
| Aug. 17 — 20 — 7 | PAID. Subscriber No. P 200 Subscription to Journal and Tribune For week ending Aug. 17, 1901. |
| Aug. 24 — 21 — 6 | PAID. Subscriber No. P 200 Subscription to Journal and Tribune For week ending Aug. 24, 1901. |
| Aug. 31 — 22 — 5 | PAID. Subscriber No. P 200 Subscription to Journal and Tribune For week ending Aug. 31, 1901. |
| Sept. 7 — 23 — 4 | PAID. Subscriber No. P 200 Subscription to Journal and Tribune For week ending Sept. 7, 1901. |
| Sept. 14 — 24 — 3 | PAID. Subscriber No. P 200 Subscription to Journal and Tribune For week ending Sept. 14, 1901. |
| Sept. 21 — 25 — 2 | PAID. Subscriber No. P 200 Subscription to Journal and Tribune For week ending Sept. 21, 1901. |
| Sept. 28 — 26 — 1 | PAID. Subscriber No. P 200 Subscription to Journal and Tribune For week ending Sept. 28, 1901. |

Name C. H. Andrews  
Address 510 Hill St.

REBATES

Paid in advance ..................................................
    (date of payment)

$............... in full to ...........................................
    (amount)

WITNESSES  
Jas. A. Fowler  
C. E. Lucky

INVENTOR  
Alfred F. Sanford  
By Cyrus Kehr  
    Atty.

No. 702,487. Patented June 17, 1902.
A. F. SANFORD.
COLLECTION FORM.
(Application filed June 24, 1901.)

(No Model.) 4 Sheets—Sheet 3.

| A - Name | Address | Route | Date Entered | Date of Discontinuance | Balance Due | Paid Balance |
|---|---|---|---|---|---|---|
| Andrews, Co. H. | 510 Hill St | P-200 | 4/3/98 | June 4, 1901 | $1.60 | June 6, 1901 |
| Adams, J. D. | 61 Main St | I-82 | 6/4/00 | | | |
| Archer, Mrs. R. | 54 Cumberland St | X-32 | 5/13/01 | | | |
| Angel, C. A. | 63 High St | M-3 | 5/14/01 | | | |
| Brown, Chas. | Main and Hill | T-11 | 9/12/00 | | | |
| Bailey, W. S. | 14 State St | D-98 | 7/24/00 | | | |
| Carter, L. C. | 46 5th Ave | A-13 | 5/6/00 | | | |
| Cunningham T. A. | 32 W. Park St | M-12 | 5/2/01 | | | |

INDEX OF SUBSCRIBERS.

Fig. 3.

WITNESSES—
Jas. A. Fowler,
C. E. Luchy.

INVENTOR—
Alfred F. Sanford
By Cyrus Kehr
Atty.

No. 702,487. Patented June 17, 1902.
A. F. SANFORD.
COLLECTION FORM.
(Application filed June 24, 1901.)

(No Model.) 4 Sheets—Sheet 4.

Fig. 4.

WITNESSES—
Jas. A. Fowler
C. E. Lucky.

INVENTOR—
Alfred F. Sanford
By Cyrus Kehr
Atty.

UNITED STATES PATENT OFFICE.

ALFRED F. SANFORD, OF KNOXVILLE, TENNESSEE.

COLLECTION-FORM.

SPECIFICATION forming part of Letters Patent No. 702,487, dated June 17, 1902.

Application filed June 24, 1901. Serial No. 65,786. (No model.)

*To all whom it may concern:*

Be it known that I, ALFRED F. SANFORD, a citizen of the United States, residing at Knoxville, in the county of Knox and State of Tennessee, have invented certain new and useful Improvements in Collection-Forms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My improvement relates particularly to forms suitably printed for use in the collection of fixed amounts payable at stated times or for stated items by a number of customers.

The invention provides a convenient means for giving receipts for payments made and for accurately keeping the accounts of persons employed in making collections.

My improvement is also designed to reduce the labor of bookkeeping.

In the accompanying drawings, Figures 1 and 2 illustrate one of a group of sheets or leaves embodying a portion of my improvement. Fig. 2 is to be applied to Fig. 1 so that the lines *a b* and *c d* will coincide. (Said page is thus divided into two figures, because it cannot be conveniently placed upon one sheet.) Fig. 3 illustrates an index of subscribers. Fig. 4 illustrates a cashier's record of collections.

The drawings described relate to forms to be used in the collection of subscriptions to a daily newspaper, said collections being due weekly during a period of six calendar months. From this illustration and the description relating thereto it will be understood how my improvement may be applied for collections covering other periods of time and made during longer or shorter intervals and for other purposes.

The form on the leaf shown by Figs. 1 and 2 is for collections to be made from one of a group of subscribers, and a group of forms is to be made up of such leaves, each representing a distinct subscriber. Each leaf is marked with a designation representing the subscriber for which the leaf stands. The leaf illustrated by the drawings is for subscriber "P-200," and this designation appears on the stub A, which extends lengthwise up and down the left-hand side of the leaf. Along the margin of said stub are a number of receipt-coupons B, B', and C, on all of which appears the same subscriber's designation. At the top of the stub A is the stub-section A', on which appear the words "Balance due April 1, 1901. $...... from ......" This is to be used for noting any amount due from subscriber "P-200" on April 1, 1901. Following said words on said stub-section are several blank lines "$...... to ......" These are for receiving entries of payments made by said subscriber subsequent to April 1, 1901, upon said balance due April 1, 1901. Two coupons B, standing opposite said stub-section A', are to be used as receipts for partial payments on the balance due April 1, 1901. If a partial payment is made on said balance, then the said payment is entered under "Payments" on the stub-section A' and on the first coupon B and said coupon delivered to the subscriber. If thereafter a second partial payment on said balance is made, then that payment is entered in the next blank space under "Payments" on said stub-section and on the second coupon and the latter delivered to the subscriber. Further coupon-receipts B for partial payments may be used, if desired. On final payment of said balance or when all of said balance is paid in a single payment the last or final coupon B' is detached and delivered to the subscriber. On each of said coupons B B appears the legend "This receipt not good for payments beyond April 1, 1901." This legend is intended to make said coupon invalid for the receipt of any payment excepting such as is to be applied to the balance due at the beginning of the period of six months for which the page stands. This prevents the collector, who may be the carrier, and the subscriber from using said coupons in lieu of the coupons C, which latter stand for the period of time covered by said leaf. The absence of the first coupon B indicates that the collector has received a payment on said balance and given a receipt therefor and that an entry should appear under "Payments" on said stub-section. The absence of every additional coupon B indicates that the collector has received additional payment on said balance and has given an additional receipt therefor. The fact that he turns in definite evidence of having received such payment or payments makes it necessary for him to report upon said subsection some amount or amounts less than the total of said balance, and as such report is necessarily made when he returns his book and as the name of the subscriber necessarily appears with the report the collector is practically compelled to make a true report. With the means at hand for promptly ascertaining the correctness of the report the collector is discouraged from making an incorrect report. If the collector turns in his book with the final coupon B' removed, then the book is evidence that he has collected and given his receipt for all of said balance, and all of said balance is of course then due from the collector.

Following the coupons B and B' is a series of receipt-coupons C, one for each of the twenty-six weeks of the six months from April 1 to September 30, inclusive. Each of said coupons is a receipt for the payment due for the week ending on the day printed upon the coupon. At the left of each of said coupons is a corresponding stub-section $A^2$. On each of said stub-sections is printed the same date designation as appears upon the coupon attached thereto, the first of said coupons bearing the date designation "April 6" and the corresponding stub-section bearing the same date, &c. In lieu of time items other items for which payment is made may be noted on said stub-sections and coupons, and where a time item is herein mentioned it is to be understood that any other item—as, for example, some commodity or service—would be an equivalent. Said stub-sections are numbered serially in both directions. At the left the numbering begins with "1" at the top of the series of said sections and ends at the bottom with "26." At the right said numbering is reversed, beginning with "1" at the bottom and ending with "26" at the top. These serial numbers are used as an aid in determining the number of coupons C removed or still remaining attached to the leaf. If, for example, nine coupons have been removed from the upper portion of the page, the bookkeeper or cashier will, by glancing at said left-hand series of numbers, see that the collector has given out nine receipts and that he should pay over nine payments, and the cashier or subscription-clerk can then also by glancing at said right-hand or reverse series of numbers see that seventeen payments are still to be collected from the subscriber for whom said leaf stands. If after September 28 (the date on the last coupon C) a balance is due from said subscriber, said balance is transferred to the stub-section A' of the leaf assigned to said subscriber for the ensuing six months, just as the last leaf may have received the entry of such a former balance. At the foot of the leaf is a form for the entry of such payment as said subscriber may make on or prior to September 28 to be applied beyond the latter date. In said form following the words "Paid in advance" is a blank for the entry of the date of said payment, and following this is a blank for the amount, and following the words "In full to" is a blank for the entry of the date of the termination of the period covered by said payment. Such advance payment is entered into said form by the person making the collection (the cashier, subscription-clerk, carrier, or special collector) at the time it is received, and this record is preserved until the book or group of forms for the next six months is opened. Then said advance payment is entered in the new form by the removal of coupons C sufficient to cover such payment—that is, all the coupons to and including the date covered by said advance payment are removed and delivered to the subscriber or destroyed or filed for reference. At the left of the lower stub-sections $A^2$ is a blank space $A^3$, bearing the word "Rebates." This is for the entry of such rebates or deductions as may be made from charges entered against the subscriber. Between said blank space $A^3$ and the stub-section A' at the left of the stub-sections $A^2$ may be placed blank lines accompanied, respectively, by the words "Name," "Address," "How often collected," and "Where collected," the first two of said blanks being for the name and address of the subscriber and the other two being for notations of the times and place of collecton. The space on said stub A not occupied by the blanks and stub-sections already described may be used for the entry of miscellaneous memoranda relating to said subscriber and the collection of payments from him. The stub-sections $A^2$ are also for the entry of the date upon which the amount for which the corresponding coupon C stands is paid or accounted for by the collector. The name or initials of the person making the entry or other suitable designation crediting such payment or indicating satisfactory accounting in lieu of payment may also be placed upon such stub-section. The beginning of a subscription may be noted on the appropriate stub-section $A^2$. Such an entry would indicate that the collector is not accountable for the coupons preceding said stub-section. Discontinuances or transfers of subscribers to other collectors may also be noted on the appropriate stub-section $A^2$.

It will be understood that for each collector there is to be a collector's book or group of leaves (when more than one collector is employed) and that the details of such books may be varied.

For convenience all the subscribers on the same route are designated by designations composed of two parts or factors—a route-designation letter coupled with an individual numeral designation. For example, the subscriber represented by the leaf illustrated by Figs. 1 and 2 is designated by "P-200," "P" being applied to all the subscribers on that route and "200" being applied to only this one subscriber on that route. The subscriber preceding this one would have the designation "P-199" and the one following would have the designation "P-201." Should there be more than twenty-six routes, the routes in excess of said number may receive double letters, as "AA," "BB," &c. (See Fig. 4.) It is obvious that other characters may be used to make such designations.

It is to be noted that the term "customer's designation" as used herein means an arbitrary or artificial designation used as a substitute for the name of the customer.

The "Subscribers' Index" and the "Cashier's Record" are intended to be used in conjunction with the "Collector's Book;" but while the three coöperate to make a more convenient system it is to be understood that the "Collector's Book" is capable of use separately from said two books or in conjunction with only one of them.

The index (illustrated by Fig. 3) is to be used in connection with the said collection book or books. Said index consists of a name-column O, address-column P, one or more route-columns Q, a date-of-entry column R, a discontinuance-column S, a balance-column T, and a payment-column U. The name-column is preferably divided into alphabetical sections, as indicated by the letters "A," "B," and "C." The names of subscribers are entered into said columns under their appropriate letters, and the corresponding addresses are written opposite in the address-column. In the first route-column opposite each subscriber's name is placed the subscriber's designation used on the leaf of the collector's book standing for said subscriber. The name of the subscriber, "C. H. Andrews," represented by the leaf illustrated by Figs. 1 and 2 is entered into the name-column of said index, and into the space in the first route-column opposite said name is placed the corresponding designation "P-200." Should said subscriber be transferred to another route, he may be given a new designation identifying him with said new route and such new designation entered in the space occupied by the former designation or in the corresponding space in the next route-column, if more than one route-column is used. In the space in the column R opposite the name "C. H. Andrews" is written the date when said name was entered into said index. The entries in the next two columns indicate that said subscriber discontinued his subscription June 4, 1901, that he then owed a balance of one dollar and sixty cents, and that he paid said balance on June 6, 1901. By the use of only the first three columns of said index the collection-book and page for any subscriber may be readily ascertained; but the data entered in the remaining columns will frequently render reference to the collector's book unnecessary. Said additional columns are therefore not essential, but a great convenience.

The cashier's record of collections (illustrated by Fig. 4) is intended to show the sum collected from each subscriber during a week, the amounts collected by each collector during the same week, and the grand total of all collections for that week. Arranged horizontally across the top of said record are the letters used as parts of the subscribers' designations, said letters being at the same time designations of routes, as already described. Under each said letter are two columns. In one of these columns appear a series of numbers ranging from "1" to a number high enough to include the total number of subscribers on one route. The other of said two columns is left blank for the reception of entries of individual payments. The use of said record will be readily understood. When the collectors' books are returned by the collectors after the weekly collection-trip, the cashier writes the appropriate date into the blank following the words "Week ending" on the cashier's record. Then he takes any one of the collector's books and notes in the corresponding column of said record the payments of that week, as indicated by the absence of coupons from said collector's book. For example, he takes collector's book "A," and on the first leaf he sees that the subscriber represented by said leaf (subscriber "A-1") made no payment that week. Hence the cashier makes no entry in the blank space opposite "1" in the adjoining column unless he makes a suitable mark, as a dash, indicating that no payment was made by said subscriber. If the second leaf indicates a payment of thirty (30) cents, the "30" is entered opposite "2," such entry indicating that subscriber "A-2" has during that week made a payment of thirty cents. In this way all the payments from route "A" are entered. Then the numbers representing said payments are added and the sum placed at the foot of said column. When the collections from all the collectors' books have been thus entered on said record and the amount of collections from each route has been noted in the space V at the foot of the appropriate column, the totals for all the routes are added, and the grand total thus received is entered into the blank following the words "Total for week." Then the record shows the payment made during that week by each subscriber, the total collected by each collector, and the grand total of all the collections.

The cashier's record may also serve as a duplicate record of payments by subscribers in case a collector's book is lost.

It is to be noted that the "Cashier's Record" and the "Index of Subscribers," as well as the "Collector's Book," may be bound in book form or that they may be in the form of loose sheets.

While the foregoing description has made reference to collections from newspaper subscribers, it is obvious that my improvement is also applicable to the making of collections from other customers.

I claim as my invention—

1. A collection-form comprising a stub embodying a series of stub-sections, and receipt-coupons attached to said stub-sections, said coupons and said stub bearing a customer's designation and every coupon and the corresponding stub-section bearing the same designation, said designation differing from similar designations applied to the other coupons and their stub-sections, and an appropriately-designated blank for receiving a record of a balance due at the beginning of the period for which said form stands, and a receipt-coupon bearing said customer's designation and bearing matter representing payment on said balance, substantially as described.

2. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and a receipt-coupon bearing said customer's designation and bearing matter representing payment on said balance, substantially as described.

3. A group of collection-forms, each comprising a stub embodying a series of stub-sections bearing matter representing successive periods of time and a series of receipt-coupons attached to said stub-sections and bearing matter pertaining, respectively, to and indicating the same periods of time, and all the coupons of the same series bearing an arbitrary customer's designation identical with a similar designation on the stub and composed of two parts or factors, one common to all the forms of said group and the other being different from the corresponding part in all the other forms, and an appropriately-designated blank for receiving a record of a balance due at the beginning of the period for which said form stands, and a receipt-coupon bearing said customer's designation and bearing matter representing payment on said balance, substantially as described.

4. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to the forms of that group, but different from the corresponding factors used for the others of said groups, and composed in part of another factor which is different from the corresponding factor in all the forms of the same group, and an appropriately-designated blank for receiving a record of a balance due at the beginning of the period for which said form stands, and a receipt-coupon bearing said customer's designation and bearing matter representing payment on said balance, substantially as described.

5. A collection-form comprising a stub embodying a series of stub-sections, and receipt-coupons attached to said stub-sections, said coupons and said stub bearing a customer's designation and every coupon and the corresponding stub-section bearing the same designation, said designation differing from similar designations applied to the other coupons and their stub-sections, and an appropriately-designated blank for receiving a record of a balance due at the beginning of the period for which said form stands, and a receipt-coupon bearing said customer's designation and bearing matter representing payment of said balance, substantially as described.

6. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and a receipt-coupon bearing said customer's designation and bearing matter representing payment of said balance, substantially as described.

7. A group of collection-forms, each comprising a stub embodying a series of stub-sections bearing matter representing successive periods of time and a series of receipt-coupons attached to said stub-sections and bearing matter pertaining, respectively, to and indicating the same periods of time, and all the coupons of the same series bearing an arbitrary customer's designation identical with a similar designation on the stub and composed of two parts or factors, one common to all the forms of said group and the other being different from the corresponding part in all the other forms, and an appropriately-designated blank for receiving a record of a balance due at the beginning of the period for which said form stands, and a receipt-coupon bearing said customer's designation and bearing matter representing payment of said balance, substantially as described.

8. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to all the forms of that group but different from the corresponding factors used for the others of said groups, and composed in part of another factor which is different from the corresponding factor in all the forms of the same group, and an appropriately-designated blank for receiving a record of a balance due at the beginning of the period for which said form stands, and a receipt-coupon bearing said customer's designation and bearing matter representing payment of said balance, substantially as described.

9. A collection-form comprising a stub embodying a series of stub-sections, and receipt-coupons attached to said stub-sections, said coupons and said stub bearing a customer's designation and every coupon and the corresponding stub-section bearing the same designation, said designation differing from similar designations applied to the other coupons and their stub-sections, and an appropriately-designated blank for receiving a record of a balance due at the beginning of the period for which said form stands, and appropriately-designated blanks for noting payments on said balance, substantially as described.

10. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and appropriately-designated blanks for noting payments on said balance, substantially as described.

11. A group of collection-forms, each comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, one common to all the forms of said group and the other being different from the corresponding part in all the other forms, and an appropriately-designated blank for receiving a record of a balance due at the beginning of the period for which said form stands, and appropriately-designated blanks for noting payments on said balance, substantially as described.

12. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to the forms of that group, but different from the corresponding factors used for the others of said groups, and composed in part of another factor which is different from the corresponding factor in all the forms of the same group, and an appropriately-designated blank for receiving a record of a balance due at the beginning of the period for which said form stands, and appropriately-designated blanks for noting payments on said balance, substantially as described.

13. A collection-form comprising a stub embodying a series of stub-sections, and receipt-coupons attached to said stub-sections, said coupons and said stub-sections bearing a customer's designation and every coupon and the corresponding stub-section bearing a designation differing from similar designations applied to the other coupons and their stub-sections, and an appropriately-designated blank for receiving a record of a balance due at the beginning of the period for which said form stands, and a receipt-coupon bearing matter representing a partial payment on said balance, and a coupon which is a receipt in full for said balance, said coupons bearing said customer's designation, substantially as described.

14. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and a receipt-coupon bearing matter representing a partial payment on said balance, and a coupon which is a receipt in full for said balance, said coupons bearing said customer's designation, substantially as described.

15. A group of collection-forms, each comprising a stub embodying a series of stub-sections bearing matter representing successive periods of time and a series of receipt-coupons attached to said stub-sections and bearing matter pertaining, respectively, to and indicating the same periods of time, and all coupons of the same series bearing an arbitrary customer's designation identical with a similar designation on the stub and composed in part of two parts or factors, one common to all the forms of said group and the other being different from the corresponding part in all the other forms, and an appropriately-designated blank for receiving a record of a balance due at the beginning of the period for which said form stands, and a receipt-coupon bearing matter representing a partial payment on said balance, and a coupon which is a receipt in full for said balance, said coupons bearing said customer's designation, substantially as described.

16. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to the forms of that group, but different from the corresponding factor used for the others of said groups, and composed in part of another factor which is different from the corresponding factor in all the forms of the same group, and an appropriately-designated blank for receiving a record of a balance due at the beginning of the period for which said form stands, and a receipt-coupon bearing matter representing a partial payment on said balance and a coupon which is a receipt in full for said balance, said coupons bearing said customer's designation, substantially as described.

17. A collection-form comprising a stub embodying a series of stub-sections, and receipt-coupons attached to said stub-sections, said coupons and said stub bearing a customer's designation and every coupon and the corresponding stub-section bearing the same designation, said designation differing from similar designations applied to other coupons and their stub-sections, and an appropriately-designated blank for receiving a record of a balance due at the beginning of the period for which said form stands, and a receipt-coupon bearing said customer's designation and matter representing payment on said balance, and an appropriately-designated blank for noting an amount paid beyond the period represented by said form, substantially as described.

18. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and a receipt-coupon bearing said customer's designation and matter representing payment on said balance, and an appropriately-designated blank for noting an amount paid beyond said period, substantially as described.

19. A group of collection-forms, each comprising a stub embodying a series of stub-sections bearing matter representing successive periods of time and a series of receipt-coupons attached to said stub-sections and bearing matter pertaining, respectively, to and indicating the same periods of time, and bearing matter representing payments and all the coupons of the same series bearing an arbitrary customer's designation identical with a similar designation on the stub and composed of two parts or factors, one common to all the forms of said group and the other being different from the corresponding part in all the other forms, and an appropriately-designated blank for receiving a record of a balance due at the beginning of the period for which said form stands, and a receipt-coupon bearing said customer's designation and matter representing payment on said balance, and an appropriately-designated blank for noting an amount paid beyond said period, substantially as described.

20. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to the forms of that group, but different from the corresponding factors used for the others of said groups, and composed in part of another factor which is different in all the forms of the same group, and an appropriately-designated blank for receiving a record of a balance due at the beginning of the period for which said form stands, and a receipt-coupon bearing said customer's designation and matter representing payment on said balance, and a suitably-designated blank for noting an amount paid beyond said period, substantially as described.

21. A collection-form comprising a stub embodying a series of stub-sections, and receipt-coupons attached to said stub-sections, said coupons and said stub bearing a customer's designation and every coupon and the corresponding stub-section bearing the same designation, said designation differing from similar designations applied to the other coupons, and their stub-sections, and an appropriately-designated blank for receiving a record of a balance due at the beginning of the period for which said form stands, and a receipt-coupon bearing said customer's designation and matter representing payment on said balance, and an appropriately-designated blank for noting a rebate, substantially as described.

22. A collection-form comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed of two parts or factors, and an appropriately-designated blank for receiving a record of a balance due at the beginning of the period for which said form stands, and a receipt-coupon bearing said customer's designation and matter representing payment on said balance, and an appropriately-designated blank for noting a rebate, substantially as described.

23. A group of collection-forms, each comprising a stub embodying a series of stub-sections bearing matter representing successive periods of time and a series of receipt-coupons attached to said stub-sections and bearing matter pertaining, respectively, to and indicating the same periods of time, and all the coupons of the same series bearing an arbitrary customer's designation identical with a similar designation on the stub and composed of two parts or factors, one common to all the forms of said group and the other being different from the corresponding part in all the other forms, an appropriately-designated blank for receiving a record of a balance due at the beginning of the period for which said form stands, and a receipt-coupon bearing said customer's designation and matter representing payment on said balance, and an appropriately-designated blank for noting a rebate, substantially as described.

24. In a collection system, a plurality of groups of forms, every form of any one of said groups comprising a stub embodying a series of stub-sections bearing matter representing successive periods of time and a series of receipt-coupons attached to said stub-sections and bearing matter pertaining, respectively, to and indicating the same periods of time and bearing matter representing payments, and all the coupons of the same series bearing an arbitrary customer's designation identical with a similar designation on the stub and composed in part of a factor common to the forms of that group, but different from the corresponding factors used for the others of said groups, and composed in part of another factor which is different in all the forms of the same group, and an appropriately-designated blank for receiving a record of a balance due at the beginning of the period for which said form stands, and a receipt-coupon bearing said customer's designation and matter representing payment on said balance, and an appropriately-designated blank for noting a rebate, substantially as described.

In testimony whereof I affix my signature, in presence of two witnesses, this 20th day of June, 1901.

ALFRED F. SANFORD.

Witnesses:
R. D. HORTON,
LUCY WILCHESTER.